Dec. 19, 1961    G. B. FOSTER ET AL    3,013,721
AUTOMATIC CONTROL SYSTEM
Filed Aug. 18, 1959
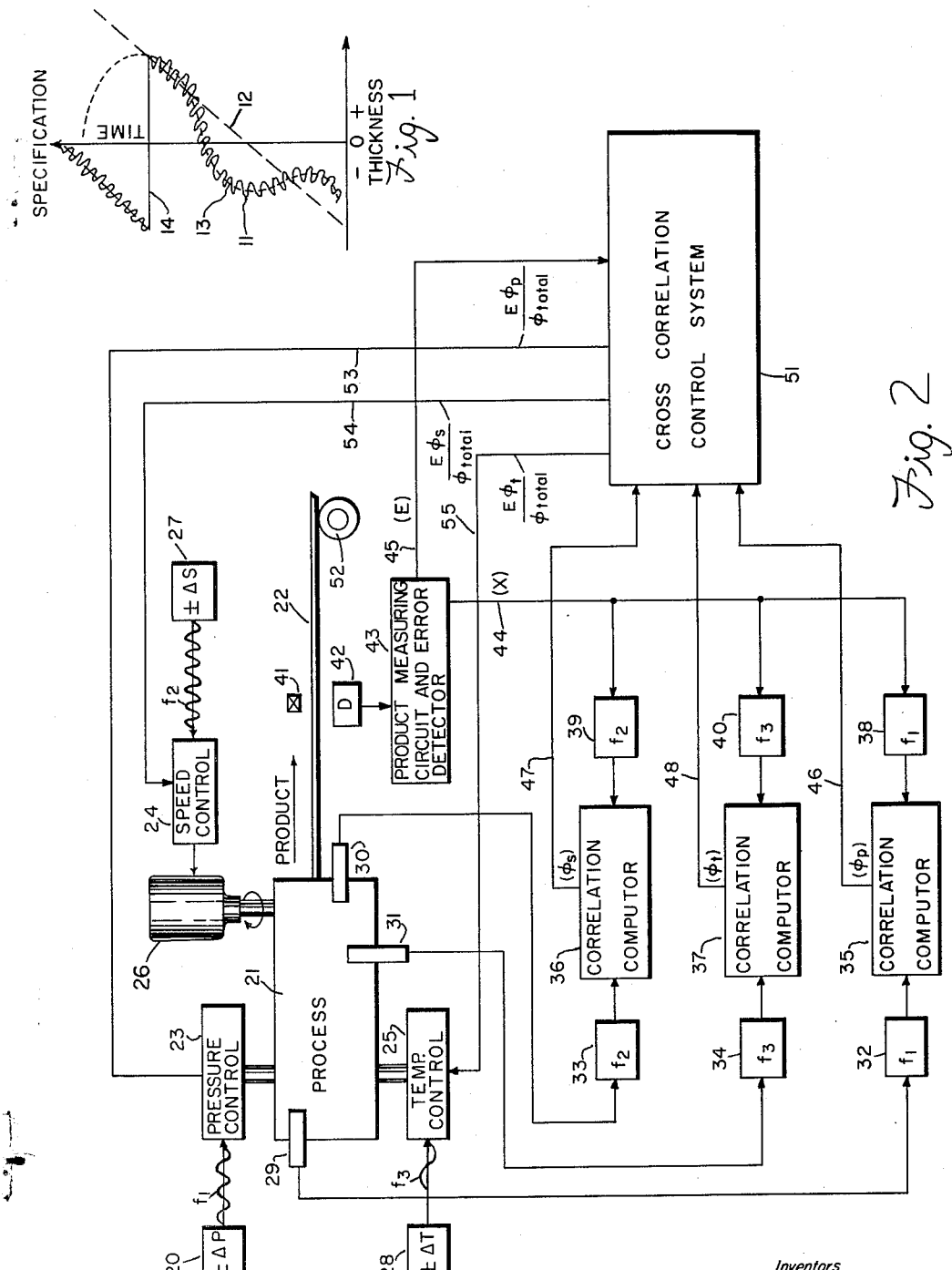
Inventors
George B. Foster
William E. Van Horne
By Anthony R. Cennamo

United States Patent Office 3,013,721
Patented Dec. 19, 1961

3,013,721
AUTOMATIC CONTROL SYSTEM
George B. Foster, Worthington, and William E. Van Horne, Columbus, Ohio, assignors to Industrial Nucleonics Corporation, a corporation of Ohio
Filed Aug. 18, 1959, Ser. No. 834,426
6 Claims. (Cl. 235—151)

This invention relates to automatic control systems and methods and more particularly to industrial process controls in which a correlation between the signals representing process variables and the product properties is utilized to control the product properties.

The application of cross-correlation computed values to control industrial processes is set forth in the copending application of Henry R. Chope, Serial No. 827,881, filed July 17, 1959, and assigned to the assignee of the present application. As there disclosed, the control of an industrial process may be enhanced by computing the cross-correlation function between the variational signals derived from the process variable values which are used to control the process and one or more of the product properties which are measured on the product which the process produces. Any divergence in the product properties from the product specification which the process is trying to hold generates an error signal which may be applied to that process variable which, by means of the cross-correlation computation, is known to be best adapted for control and correction of the particular product error.

The application of cross-correlation control in certain industrial processes may encounter process variables which are substantially constant or which can be sensed only in signal channels which have a poor signal-to-noise ratio for the variational signal of the process variable. Under such conditions the computation of the correlation coefficient is difficult and may result in erroneous values in extreme cases.

It is accordingly the principal object of the present invention to provide an improved correlation control method and system in which the variational signals of the process variables are introduced in a controlled manner.

A further object of this invention is to provide a process control system in which variational signals are superposed on the process variables with a predetermined frequency in order that signal channels for the processing of signals derived from the superposed variations may be made frequency selective thereby to improve the signal-to-noise ratio.

A further object is to provide superposed variations on the process variables of different fundamental frequency in order that selective signal channels may be employed for separating the control signals in the control system.

A further object of this invention is to introduce variational signals in the process variables which may be made compatible with the response capability of the controller and the inertia of the system relative to each particular variable.

These and other objects of the invention will be apparent from the following detailed description taken in conjunction with the accompanying drawings wherein:

FIG. 1 is a diagram representing the deviation of a product property from the specification value of the product as a function of time for a continuous production of the product;

FIG. 2 is a block diagram, partly schematic, of a control system in accordance with the invention.

The disclosed preferred embodiment of the invention is shown as applied to a process for continuously producing a product with the product properties controlled by controlling the process variables. Superposed on one or more of the process variables is an incremental variation in the process variable value which has a particular fundamental frequency. Variations in a plurality of process variables produce corresponding frequency component variations in the product property detected at the output of the process and these frequency components may be selectively applied to correlation computers along with a signal corresponding to the respective incremental variation applied to the process variables. Accordingly, the cross-correlation between these two functions is computed after frequency selection in both channels of the input to the correlator to improve the signal-to-noise ratio and obtain a computation at all times irrespective of the presence or absence of inherent variations in the process variables. The computed cross-correlation functions are employed to control the process in the manner described in the aforementioned application.

Referring to FIG. 1, a time function is shown representing the measured value of a product property as it is produced in a continuous process relative to a vertical axis at zero value representing the specification which is the desired value for the process to hold. Deviations to the right or left of the vertical axis at zero represent positive or negative errors in the product property which are measured by a suitable detector for deriving a control error signal. A typical continuous function of time is indicated by the wave 11. The complex form of the wave 11 can be simplified somewhat by considering the components of the various waves which, if suitably combined, would yield the wave form 11. Thus an average value axis drawn for the wave 11, as indicated by the straight line 12, and a cycle-by-cycle average value line 13 make it apparent that the wave 11 can be considered a cyclical or random variation relative to the axis 13 which axis itself is subject to a variation pressure, temperature and speed. For such a process the pressure process variable will be subject to control by a pressure controller 23, speed will be controlled by a speed controller 24 and temperature will be controlled by a temperature controller 25. It will be understood that these variables are disclosed as typical variables which are subject to automatic control and for any particular process the selection of the variables to be controlled will be determined in view of the complete circumstances relating to the particular process. The particular means for effecting the various controls are known in the art and form no part of the present invention. In general these controls respond to an electric signal which produces a result generally proportional to the magnitude or duration of the signal. In accordance with the present invention an incremental variational signal is superposed on one or more of the process variables. For example, a small sinusoidal voltage may be superposed on the control voltage which controls a particular process variable. Other forms of introducing incremental changes of course may be employed. For example, in the pressure controller 23 a mechanical piston or other pumping device may alternately increase and decrease the average pressure value at a known rate. In the speed control device 24 a mechanical differential can be employed alternately to increase or decrease the speed of the process controlled by the motor 26. Alternatively, the electrical control of the motor 26 may introduce a hunting above and below an average speed value. In temperature controller 25 variations in the temperature can be introduced by electrical signals or by mechanically varying the temperature control device at a predetermined rate between predetermined limits. Inasmuch as means for varying the process variables would be apparent to those skilled in the art, the variation provided for the purpose of this invention is indicated as introduced by incremental variation devices 20, 27 and 28. The device 20 introduces a positive and negative pressure increment to the value of pressure established by the controller 23. The incremental speed device 27 introduces a positive and negative increment to the speed established by the speed controller 24. The temperature increment device 28 introduces a positive and negative variation in the temperature established by the temperature control 25. In any instance, of course, the positive and negative increments may be dispensed with and a wholly positive or wholly negative variation employed. In general the induced variation of the process variable will preferably be an adjustable amplitude sinusoid of adjustable frequency and in each instance a particular amplitude and frequency are selected for each variable. As indicated in FIG. 2, the frequencies are $f_1$ for the pressure variation, $f_2$ for the speed variation and $f_3$ for the temperature variation. The frequencies selected for these variations will preferably be non-harmonically related and correspond with the ability of the process 21 to follow a sinusoidal variation. Accordingly, pressure and speed variations may be relatively high frequency signal components while, in general, the temperature control of the process will have applied a relatively low frequency variation due to the thermal inertia of the process and the associated apparatus.

By means of suitably placed transducers 29, 30, 31, the different variables of process 21 are sensed with suitable sensitivity and frequency response to provide at the output of the respective transducers variational signals corresponding to the variation of the process variables at the frequencies imposed by the devices 20, 27, 28. These signals are filtered through suitable filters 32, 33, 34 which are band pass devices having a pass band centered at the respective frequencies $f_1$, $f_2$, and $f_3$. The output signals from the filters 32, 33, 34 are applied respectively to correlation computers 35, 36, 37. A second set of input signals is applied to the correlation computers 35, 36, 37 from a set of band pass filters 38, 39, 40. These signals are the frequency components of the detected product property signal which pass through the pass band of the respective filters 38, 39, 40. The input signals to the filters 38, 39 and 40 are derived from a product property measuring system such as a radiation source 41, a detector 42 and suitable measuring circuit and error detection circuits 43. The measuring system which includes source 41 and detector 42 may be of the type which is fully described in Patent No. 2,790,945; the manner in which the measuring circuit thereof is supplemented by means to additionally provide the error detection function may be as illustrated in FIG. 2 of Patent No. 2,895,888. The circuit 43 provides on output lead 44 a signal representative of the property of the product 22 which is measured by the gauging device 41, 42 and on output lead 45 provides an error signal which corresponds to the difference between the signal on lead 44 and the product specification which the process is set to hold.

The individual frequency components on lead 44 which correspond to the frequencies $f_1$, $f_2$, $f_3$ and which occur in the product 22 as a result of the variations imposed by the devices 26, 27, 28 are thus supplied to the respective correlation computers 35, 36, 37 to compute the cross-correlation function between the two input quantities. The computation of the cross-correlation function is disclosed in the aforementioned copending application and can be carried on as there disclosed or as known in the art. The quantity on the line 46 has a value corresponding to the cross-correlation of the pressure signal $f_1$ and the thickness dimension signal component $f_1$ which are the input variables to the correlator 35. The output on line 47 is the cross-correlation function computed from the speed signal at frequency $f_2$ applied from filter 33 and the corresponding $f_2$ frequency component found in the thickness signal on line 44. The output on line 48 is the cross-correlation function corresponding to temperature variation signals $f_3$ from filter 34 and corresponding $f_3$ frequency component variations in the thickness dimension on line 44. Each of the signals on line 46, 47, 48 is applied to a cross-correlation control system 51. The cross-correlation control device 51 may be in the form shown in the aforementioned copending application for the purpose of computing the distribution of the error signal from line 45 applied thereto in accordance with the individual correlation functions from lines 46, 47, 48. If the individual correlation functions are $\phi_p$, $\phi_s$ and $\phi_t$ then the sum of these quantities $\phi_{total}=\phi_p+\phi_s+\phi_t$ can be used to distribute the error signal E in accordance with the ratios $$\frac{\phi_p E}{\phi_{total}}, \frac{\phi_s E}{\phi_{total}} \text{ and } \frac{\phi_t E}{\phi_{total}}$$

As disclosed in the aforementioned application this computation can be on a periodic basis keyed to the production of the product 22 or in certain instances averaging circuits can be employed to obtain continuous values of the correlation coefficient. For intermittent control systems an output device 52 may be used to sense the rate of production of the product 22 and actuate the computer at predetermined intervals related to the production rate. As shown in FIG. 2 of the aforementioned application, the integration in correlation computers 35, 36, 37 may also be controlled periodically from the device 52.

As a result of the distribution of the error signal in accordance with the ratio of the individual cross-correlation functions to the sum of all the cross-correlation functions, there appear at output lines 53, 54, 55 error signals apportioned in accordance with the teaching of the aforementioned application which are derived with high accuracy by means of the improved signal circuits of the present invention. These signals are applied to the respective controllers 23, 24, 25 for altering the process variables controlled thereby in a known manner. For example, the controllers 23, 24, 25 can operate on a continuous basis or in an intermittent fashion such as disclosed for example in the U.S. patent of Donald E. Varner, No. 2,895,888, "Electrolytic Plating Apparatus and Process," and assigned to the assignee of the present application. In the intermittent control system disclosed in the Varner patent, the error signals appearing across potentiometer 120 in FIG. 2 thereof would be supplied from the lines 53, 54, 55, respectively, of the present disclosed invention for the purpose of initiating periodic changes in the process variable controlled by the particular controller. In accordance with the intermittent control system there disclosed, the correction made to the process variable is completed and no further correction is made until the corrected product appears at the measuring device corresponding to detector 42 of the present disclosure. For continuous or average value computation of correlation the intermittent controller would operate from the average value as presented on the lines 53, 54, 55. However, it is also possible in an intermittent correlation computation as disclosed in assignee's aforementioned application, Serial No. 827,881 of Henry R. Chope to synchronize the intermittent computation of correlation to occur between the periods of intermittent correction afforded by the intermittent control system of the aforementioned Varner patent.

Many modifications of the present invention will now be apparent to those skilled in the art. For example, any number of process control variables can be selected for control and of these any suitable number can be varied incrementally to produce variational signals of a predetermined frequency. These induced variations are translated by the system with the aid of band pass filters to produce improved computation of the cross-correlation function. Obviously, the invention is applicable to a wide variety of processes other than those of the type particularly disclosed herein. Accordingly, the invention is not to be considered as limited to the particular preferred embodiment disclosed, but only by the scope of the appended claims.

We claim:

1. An industrial process control system for controlling the properties of a continuously produced product comprising, a plurality of devices for establishing values of respective process variables, signal operated controllers for said devices, means for varying one of said process variables at a predetermined frequency, means for sensing time varying signals corresponding to the variations of said process variables, means for sensing the value of a property of said product, means for computing the cross-correlation coefficient between variations in said value of said property and variations in said values of said process variables, respectively, means for generating an error signal corresponding to the difference between said sensed value of said property and a specification value for said property, and means for supplying signals to said controllers in accordance with said error signal and said respective cross-correlation coefficients.

2. Apparatus according to claim 1 in which said means for computing cross-correlation coefficients includes frequency selective means at said predetermined frequency for input signals of said one variable.

3. A control system for an industrial process having a plurality of controllable process variables affecting a characteristic of the product of said process, comprising means for controlling said process variables, said controlling means including means for inducing incremental variations at a selected frequency in at least one of said process variables; means including a plurality of sensing means each responsive to one of said process variables for generating signals indicative of the values of respective ones of said process variables, means responsive to said product characteristic for generating a signal indicative of the value thereof, a plurality of computer means each receiving a pair of said generated signals and each providing an output signal indicative of the value of a functional relation between said characteristic value-indicative signal and one of said process variable value-indicative signals, frequency selective means associated with the one of said computer means which receives said process variable value-indicative signal having said incremental variations induced therein for rendering said last mentioned computer means selectively responsive to changes in the values of its received signals which occur at said selected frequency, means responsive to a deviation in said characteristic value-indicative signal from a selected value thereof for generating an error signal proportional to said deviation, and means responsive to said error signal and said functional relation value-indicative signals for providing a plurality of control signals for energizing said process variable control means, each of said control signals being proportional both to the value of said error signal and the value of a respective one of said functional relations.

4. A control system as in claim 3 wherein each of said computer means comprises means for computing the cross-correlation coefficient between said pair of signals received thereby, and wherein said output signal comprises an electrical quantity proportional to said coefficient.

5. A control system as in claim 3 wherein said frequency selective means comprises a pair of band pass filters respectively connecting said generated signals in said pair to said computer.

6. A control system for an industrial process having a plurality of controllable process variables affecting a characteristic of the product of said process, comprising means for controlling said process variables, said controlling means including means for inducing incremental variations in at least two of said process variables, said incremental variations in said two variables respectively having different, non-harmonically related frequencies; means including a plurality of sensing means each responsive to one of said process variables for generating signals indicative of the values of respective ones of said process variables, means responsive to said product characteristic for generating a signal indicative of the value thereof, a plurality of computer means each receiving a pair of said generated signals and each providing an output signal indicative of the value of a functional relation between said characteristic value-indicative signal and one of said process variable value-indicative signals, at least two frequency selective means each associated with one of said computer means which receives one of said process variable value-indicative signals having said incremental variations induced therein for rendering said last mentioned computer means selectively responsive to changes in the values of its received signals which occur at the corresponding one of said selected frequencies, means responsive to a deviation in said characteristic value-indicative signal from a selected value thereof for generating an error signal proportional to said deviation, and means responsive to said error signal and said functional relation value-indicative signals for providing a plurality of control signals for energizing said process variable control means, each of said control signals being proportional both to the value of said error signal and the value of a respective one of said functional relations.

References Cited in the file of this patent

A. B. Chelustkin: "The Design and Application of Correlation Control" (Automatic Control, May 1958), pp. 16–18. Copy in Div. 23.

K. W. Goff: "An Analog Electronic Correlator for Acoustic Measurements" (Journal of the Acoustical Society of America, March 1955), pp. 223–236.

"Standards on Electronic Computers: Definitions of Terms, 1950," Proceedings of the IRE, March 1951, p. 272 relied on.